United States Patent [19]
Manning et al.

[11] 3,888,895
[45] June 10, 1975

[54] PRODUCTION OF TITANIUM ACETYLACETONATE BIS(DIMETHYLAMINE)

[75] Inventors: Andrew J. Manning, Randolph Township; Michael J. Ram, West Orange, both of N.J.

[73] Assignee: Celanese Corporation, New York, N.Y.

[22] Filed: Feb. 13, 1974

[21] Appl. No.: 442,039

[52] U.S. Cl. .......... 260/429.5; 106/308 Q; 252/8.6; 252/431 R; 260/468 R
[51] Int. Cl. .............................................. C07f 7/28
[58] Field of Search ................................. 260/429.5

[56] References Cited
UNITED STATES PATENTS
3,057,753    10/1962    Blatz ............................... 260/429.5
3,474,484    8/1967    Matthews et al. ............... 260/429.5

FOREIGN PATENTS OR APPLICATIONS
1,081,880    1/1959    Germany ......................... 260/429.5

Primary Examiner—Helen M. S. Sneed

[57] ABSTRACT

A novel chelated ester of orthotitanic acid is provided having the chemical structure of titanium acetylacetonate bis(dimethylamine). The titanium chelate may be formed by reacting N,N-dimethylacetamide with titanium acetylacetonate while dissolved in isopropanol under the reaction conditions described. The product following recovery is soluble in N,N-dimethylacetamide, offers substantially different solubility characteristics than titanium acetylacetonate, and is particularly suited for use in applications where an alcohol solvent would be detrimental.

9 Claims, No Drawings

PRODUCTION OF TITANIUM ACETYLACETONATE BIS(DIMETHYLAMINE)

BACKGROUND OF THE INVENTION

A number of organic titanates are commercially available and are recognized to constitute an important class of organic compounds of proven usefulness in widely differing areas of chemical technology. Such organic titanates may be provided as either simple or chelated esters of orthotitanic acid. Representative uses for the organic titanates include: chemical intermediates, adhesion promotion, dispersants, catalysts, scratch resistant finishes for glass, masonry water repellents, cross-linking agents, etc.

Titanium acetylacetonate has heretofore been regarded as one of the more common chelated esters of orthotitanic acid. However, this compound by necessity always has been provided in a concentrated isopropanol solution in which it was formed. Any attempts at the removal of the isopropanol solvent via distillation have resulted in an undesirable polymerization of the titanium acetylacetonate which has destroyed its usefulness. Accordingly, this chelate must be utilized in those applications wherein the isopropanol solvent is not detrimental.

It is an object of the present invention to provide a novel organic titanate.

It is an object of the present invention to provide a novel chelated ester of orthotitanic acid which possesses substantially different characteristics than titanium acetylacetonate.

It is an object of the present invention to provide a novel chelated ester of orthotitanic acid which is readily soluble in N,N-dimethylacetamide.

It is an object of the present invention to provide a novel chelated ester of orthotitanic acid which is capable of isolation and which readily may be recovered from the reaction mixture in which it was formed without undergoing chemical modification.

It is an object of the present invention to provide a novel chelated ester of orthotitanic acid which may be provided in the absence of an alcohol solvent and which is particularly suited for end use applications where an alcohol solvent would be detrimental.

It is another object of the present invention to provide a novel chelated ester of orthotitanic acid which is more stable than titanium acetylacetonate of the prior art.

It is another object of the present invention to provide a novel chelated ester of orthotitanic acid which is suited for utilization as a chemical intermediate, an adhesion promotor, a hydroxy cross-linking agent, a water repellent, etc.

It is a further object of the present invention to provide a process wherein titanium acetylacetonate bis(dimethylamine) readily may be formed.

These and other objects as well as the scope, nature, and utilization of the claimed invention will be apparent from the following description and appended claims.

SUMMARY OF THE INVENTION

Titanium acetylacetonate bis(dimethylamine) is provided.

It has been found that a process for the production of titanium acetylacetonate bis(dimethylamine) comprises:

a. providing a solution of titanium acetylacetonate in isopropanol,
b. heating the solution in the presence of N,N-dimethylacetamide until titanium acetylacetonate bis(dimethylamine) is formed, and
c. recovering the titanium acetylacetonate bis(dimethylamine) product.

DESCRIPTION OF PREFERRED EMBODIMENTS

A solution of titanium acetylacetonate in isopropanol initially is provided. For instance, the titanium acetylacetonate may be present in the isopropanol solvent in a concentration of about 50 to 90 percent by weight based upon the total weight of the solution. In a particularly preferred embodiment the titanium acetylacetonate is provided in a concentration of about 75 percent by weight based upon the total weight of the solution. If desired, the solution conveniently may be procured from DuPont under the designation Tyzor AA organic titanate and contains about 75 percent by weight titanium acetylacetonate based upon the total weight of the solution in an isopropanol solvent. One may optionally include with the isopropanol solvent a minor concentration of a supplemental solvent, e.g. trichloroethylene, benzene, ethyl acetate, isopropyl acetate, methanol, ethanol, etc., provided the solvent selected does not interfere with the formation of the desired chelate as described hereafter.

In order to form the titanium acetylacetonate bis(dimethylamine) chelate of the present invention the solution of titanium acetylacetonate in isopropanol is heated in the presence of N,N-dimethylacetamide. The N,N-dimethylacetamide reactant possesses the formula $CH_3CON(CH_3)_2$ and is sometimes identified as DMAC. This reactant is preferably provided in a substantially stoichiometric concentration for the formation of the desired chelate. However, less than stoichiometric amounts may be used to produce chelates of varying degrees of substitution. The entire charge of N,N-dimethylacetamide may be admixed with the solution of titanium acetylacetonate in isopropanol at the commencement of the reaction, or portions thereof intermittently may be added.

A representative reaction zone in which the desired chelate forming reaction may be conducted is an externally heated glass lined reactor provided with a reflux condenser.

In a preferred embodiment of the process the reaction is carried out at a temperature of about 100° to 160°C. while under reflux conditions, and most preferably at a temperature of about 120° to 130°C. The reactants are maintained at the elevated temperature until titanium acetylacetonate bis(dimethylamine) is formed. The residence time required to complete the reaction varies with the temperature of the reaction zone. Commonly the desired product may be formed within a residence time of about 1 to 30 hours at a temperature of about 100° to 160°C. When the reaction zone is maintained at a temperature of about 120° to 130°C. reaction periods of about 18 to 24 hours commonly are selected.

During the chelate forming reaction by-products of isopropyl acetate and acetylacetone are formed.

The titanium acetylacetonate bis(dimethylamine) product next is recovered from the reaction medium. Since the chelate product does not polymerize upon its separation from the reaction medium, it may be recovered in a substantially pure form without deleteriously influencing its properties. In a preferred embodiment the titanium acetylacetonate bis(dimethylamine) product is separated through the distillation at subatmospheric pressure (e.g. at about 20 mm of Hg) of isopropanol, N,N-dimethylacetamide, and extraneous by-products of the reaction such as isopropyl acetate and acetylacetone. The distillation conveniently may be carried out at a temperature of about 90° to 150°C. and preferably at a temperature of about 120° to 130°C.

The titanium acetylacetonate bis(dimethylamine) product of the present invention may be represented by the following structural formula:

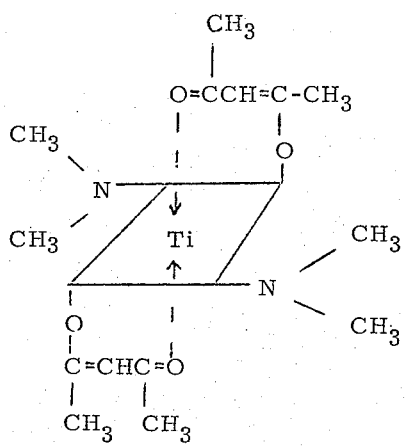

The product is a brown liquid at ambient conditions and exhibits a decomposition point at about 178° to 182°C. A chelate having less than the stoichiometric degree of substitution may exhibit a wider range of decomposition temperature, e.g. about 140° to 185°C. Unlike the titanium acetylacetonate starting material, the product is compatible with polymer systems which are insoluble in isopropanol, such as polyacrylonitrile, cellulose acetate, polybenzimidazoles, etc.

The titanium acetylacetonate bis(dimethylamine) product may generally be utilized in those applications where titanium acetylacetonate has heretofore been utilized. For instance, it may be employed as a chemical intermediate, an adhesion promoter, a cross-linking agent, a catalyst for alcohol-carboxylic acid esterifications, etc. The product is particularly suited for use in applications where an accompanying alcohol solvent would be detrimental.

The following example is given as a specific illustration of the present invention. It should be understood, however, that it is not essential that the process be carried out employing the exact conditions set forth in the example.

EXAMPLE 75 parts by weight of titanium acetylacetonate dissolved in 25 parts by weight of isopropanol while at room temperature (i.e. about 25°C.) are introduced into a glass reaction chamber provided with a reflux condenser. The isopropanol solution of titanium acetylacetonate is available from DuPont under the designation Tyzor AA organic titanate. 50 parts by weight of N,N-dimethylacetamide while at room temperature (i.e. about 25°C.) are introduced into the reaction chamber.

The temperature of the reaction chamber is raised to 120°C. over a period of 2 hours while substantially total reflux is accomplished. The contents of the reaction zone are maintained at 120°C. for 24 hours while substantially total reflux continues. After 24 hours at reflux conditions the contents of the reaction chamber are brown to reddish brown in appearance.

Reflux conditions are terminated, and the contents of the reaction zone are placed under a subatmospheric pressure of about 20mm of Hg. while continuing to maintain the same at 120°C. After 60 minutes substantially all of the isopropanol solvent, and the reaction by-products, e.g. isopropyl acetate and acetylacetone, are removed from the substantially pure titanium acetylacetonate bis(dimethylamine) product which remains in the reaction chamber. The reaction zone is maintained at the subatmospheric pressure for 24 hours to assure removal of all traces of isopropanol, N,N-dimethylacetamide, isopropyl acetate, and acetylacetone. The product possesses a structural formula identical to that previously illustrated, and is a brown liquid when examined at ambient conditions having a decomposition temperature of about 178°C.

Although the process of the present invention has been described with a preferred embodiment, it is to be understood that variations and modifications may be employed without departing from the concept of the invention as defined in the accompanying claims.

We claim:

1. Titanium acetylacetonate bis(dimethylamine).
2. A process for the production of titanium acetylacetonate bis(dimethylamine) comprising:
    a. providing a solution of titanium acetylacetonate in isopropanol,
    b. heating said solution in the presence of N,N-dimethylacetamide until titanium acetylacetonate bis(dimethylamine) is formed, and
    c. recovering the titanium acetylacetonate bis(dimethylamine) product.
3. A process for the production of titanium acetylacetonate bis(dimethylamine) according to claim 1 wherein said solution of step (a) contains about 50 to 90 percent by weight titanium acetylacetonate based upon the total weight of the solution.
4. A process for the production of titanium acetylacetonate bis(dimethylamine) according to claim 1 wherein said solution of step (a) contains about 75 percent by weight titanium acetylacetonate based upon the total weight of the solution.
5. A process for the production of titanium acetylacetonate bis(dimethylamine) according to claim 1 wherein said solution in step (b) is heated at about 100° to 160°C. under reflux conditions.
6. A process for the production of titanium acetylacetonate bis(dimethylamine) according to claim 1 wherein said solution in step (b) is heated in the presence of a substantially stoichiometric amount of N,N-dimethylacetamide.
7. A process for the production of titanium acetylacetonate bis(dimethylamine) according to claim 1 wherein said product is recovered in step (c) through the distillation at subatmospheric pressure of isopropanol, N,N-dimethylacetamide, and extraneous by-products of said reaction of step (b).

8. A process for the production of titanium acetylacetonate bis(dimethylamine) comprising:
   a. providing a solution of titanium acetylacetonate in isopropanol wherein said titanium acetylacetonate is present in a concentration of about 75 percent by weight based upon the total weight of the solution,
   b. heating said solution in the presence of a substantially stoichiometric concentration of N,N-dimethylacetamide under reflux conditions at a temperature of about 100° to 160°C. for about 1 to 30 hours wherein titanium acetylacetonate bis(dimethylamine) is formed, and
   c. recovering said titanium acetylacetonate bis(dimethylamine) product through distillation at subatmospheric pressure at a temperature of about 90° to 150°C. of isopropanol, N,N-dimethylacetamide, and extraneous by-products of said reaction of step (b).

9. A process for the production of titanium acetylacetonate bis(dimethylamine) according to claim 8 wherein said solution in the presence of a substantially stoichiometric concentration of N,N-dimethylacetamide is heated in step (b) under reflux conditions at a temperature of about 120° to 130°C. for about 18 to 24 hours.

* * * * *